United States Patent
Konno et al.

[11] Patent Number: 6,028,740
[45] Date of Patent: Feb. 22, 2000

[54] STRUCTURE FOR PREVENTING HEAD JUDDER OF MAGNETIC DISK DRIVE

[75] Inventors: Makoto Konno; Hisashi Shibata; Koichi Seno, all of Yamagata, Japan

[73] Assignee: Mitsumi Electric, Co., Ltd., Tokyo, Japan

[21] Appl. No.: 09/038,231

[22] Filed: Mar. 11, 1998

[30] Foreign Application Priority Data

Mar. 12, 1997 [JP] Japan .................................. 9-057252

[51] Int. Cl.$^7$ ........................... G11B 21/20; G11B 17/32
[52] U.S. Cl. ................................................................ 360/104
[58] Field of Search ..................................... 360/103, 104

[56] References Cited

U.S. PATENT DOCUMENTS

| | | | |
|---|---|---|---|
| 4,408,238 | 10/1983 | Hearn | 360/104 |
| 4,760,478 | 7/1988 | Pal et al. | 360/104 |
| 5,187,625 | 2/1993 | Blaeser et al. | 360/104 |
| 5,270,888 | 12/1993 | Collisson et al. | 360/104 |
| 5,473,487 | 12/1995 | Nagase | 360/104 |
| 5,530,606 | 6/1996 | Baasch et al. | 360/104 |
| 5,650,894 | 7/1997 | Ikeda | 360/104 |
| 5,751,518 | 5/1998 | Konno et al. | 360/104 |

FOREIGN PATENT DOCUMENTS

| | | |
|---|---|---|
| 62-154381 | 7/1987 | Japan . |
| 1-124114 | 5/1989 | Japan . |
| 5-101425 | 4/1993 | Japan . |
| 8-255319 | 10/1996 | Japan . |

Primary Examiner—William J. Klimowicz
Attorney, Agent, or Firm—Whitham, Curtis & Whitham

[57] ABSTRACT

A structure for preventing head judder of a magnetic disk drive is disclosed. The structure comprises an opening provided at front end portion of an upper plate of a head carriage, a gimbal disposed within the opening, a magnetic head hangingly disposed on a central lower face of the gimbal, a pivot spacer disposed between the upper plate and a central upper face of the magnetic head, and at least one pair of adhesive tapes, inner ends of the adhesive tapes are respectively stuck on near central upper face of the gimbal, and the adhesive tapes symmetrically extend towards right and left end of the gimbal.

19 Claims, 6 Drawing Sheets

STRUCTURE FOR PREVENTING HEAD JUDDER OF MAGNETIC DISK DRIVE

BACKGROUND OF THE INVENTION

1. Technical Field of the Invention

The present invention relates to a head of a magnetic disk drive. Specifically, a structure for preventing head judder or noise caused by the head rubbing against a magnetic disk drive.

2. Background of the Related Art

FIGS. 6 and 7 show a head carriage 1 of a magnetic disk drive. Here, a magnetic head 3 is disposed on a lower face at a front end portion of an upper plate 2 of the head carriage 1, and a magnetic head is disposed on an upper face at a front end portion of a base plate 4. The magnetic heads 3 and 5 are facing each other and a magnetic disk (not shown) is inserted therebetween and rotated in order to record or reproduce magnetic information. At the present time, head judder is caused by the magnetic head 3 rubbing against the magnetic disk drive.

To prevent this, an opening 6 is provided at the front end portion of the upper plate 2 and a gimbal 7 is disposed so as to fill up the opening 6 from a downward surface. The gimbal 7 absorbs vibration of the magnetic head 3 due to rubbing against the magnetic disk. At a central portion in a lower face of the gimbal 7, the magnetic head 3 is hangingly disposed. Further, at a central portion in an upper face of the magnetic head 3, a pivot spacer 8 made of rubber is provided, and the pivot spacer 8 is exposed upwards through a central hole 9 of the gimbal 7.

Furthermore, in a middle portion of a rear side edge of the opening 6 (in FIG. 6, lower edge), there is provided a projection 10 protruding from a main body of the upper plate 2. The projection 10 is triangle-shaped in a plan view. On a lower face of tip end of the projection 10, a pin 11 is hangingly provided and a tip end of the pin 11 is abutted against the pivot spacer 8 this supports the magnetic head 3 and central portion of the gimbal 7.

However, the head judder cannot be prevented completely by only the aforementioned structure because of an abrasion condition of the magnetic disk.

SUMMARY OF THE INVENTION

The object of the present invention is to reduce the head judder. To achieve this object, there is provided a structure for preventing head judder of a magnetic disk drive comprises an opening provided at a front end portion of an upper plate of a head carriage, a gimbal disposed within the opening, a magnetic head hangingly disposed on a central lower face of the gimbal, a pivot spacer disposed between the upper plate and a central upper face of the magnetic head, and at least one pair of adhesive tapes, where inner ends of the adhesive tapes are respectively stuck on near central upper face of the gimbal, and the adhesive tapes symmetrically extend towards right and left ends of the gimbal.

DETAILED DESCRIPTION OF THE EMBODIMENT

Figure 1:
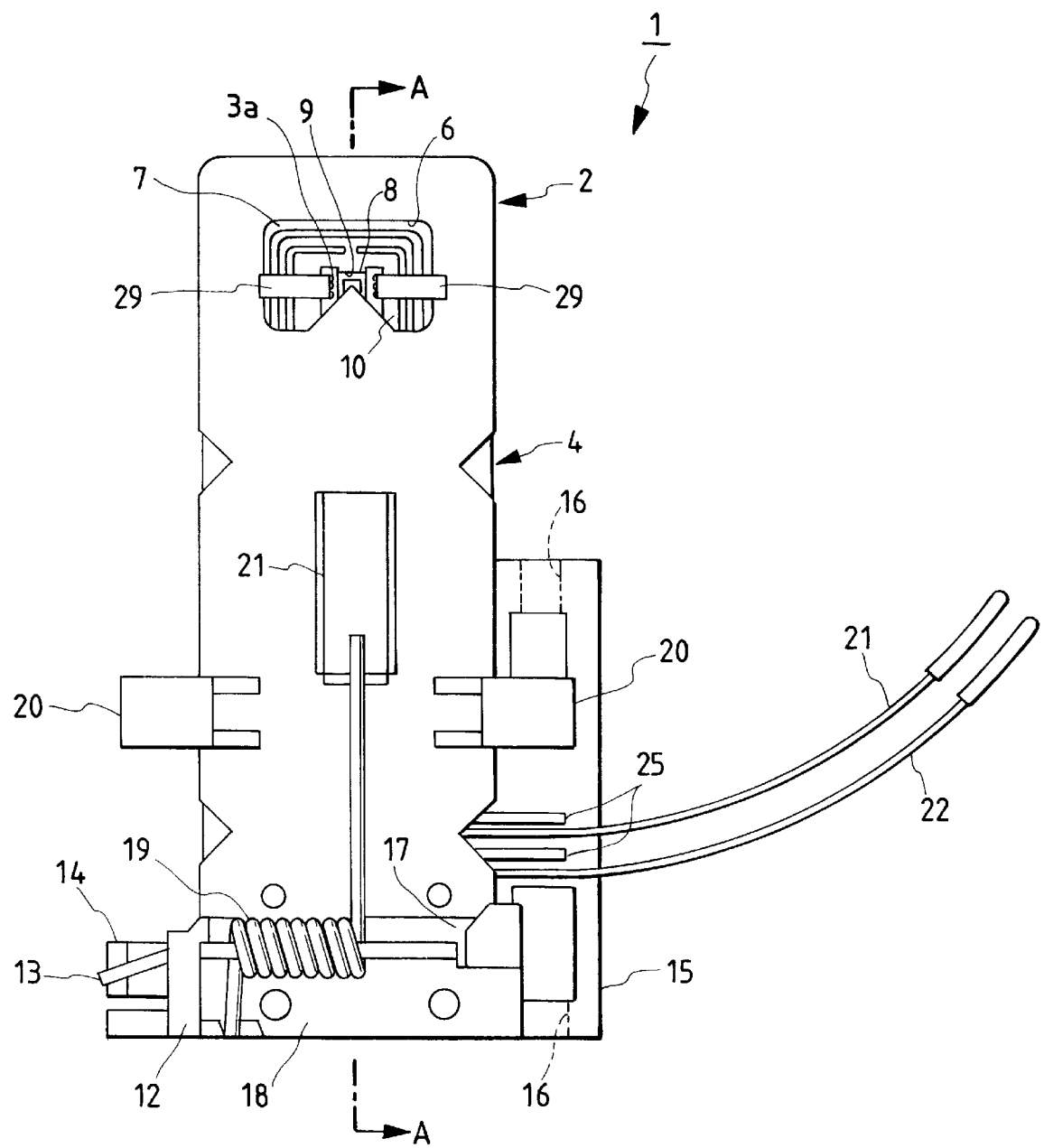
FIG. 1 is a plan view of a head carriage in one embodiment of the present invention.

Now, descriptions will be given below in detail of one embodiment of the present invention with reference to FIGS. 1 to 5. To simplify the explanation, same reference numerals are applied to duplicate elements of the conventional structure and the descriptions for the elements are omitted.

Figure 2:
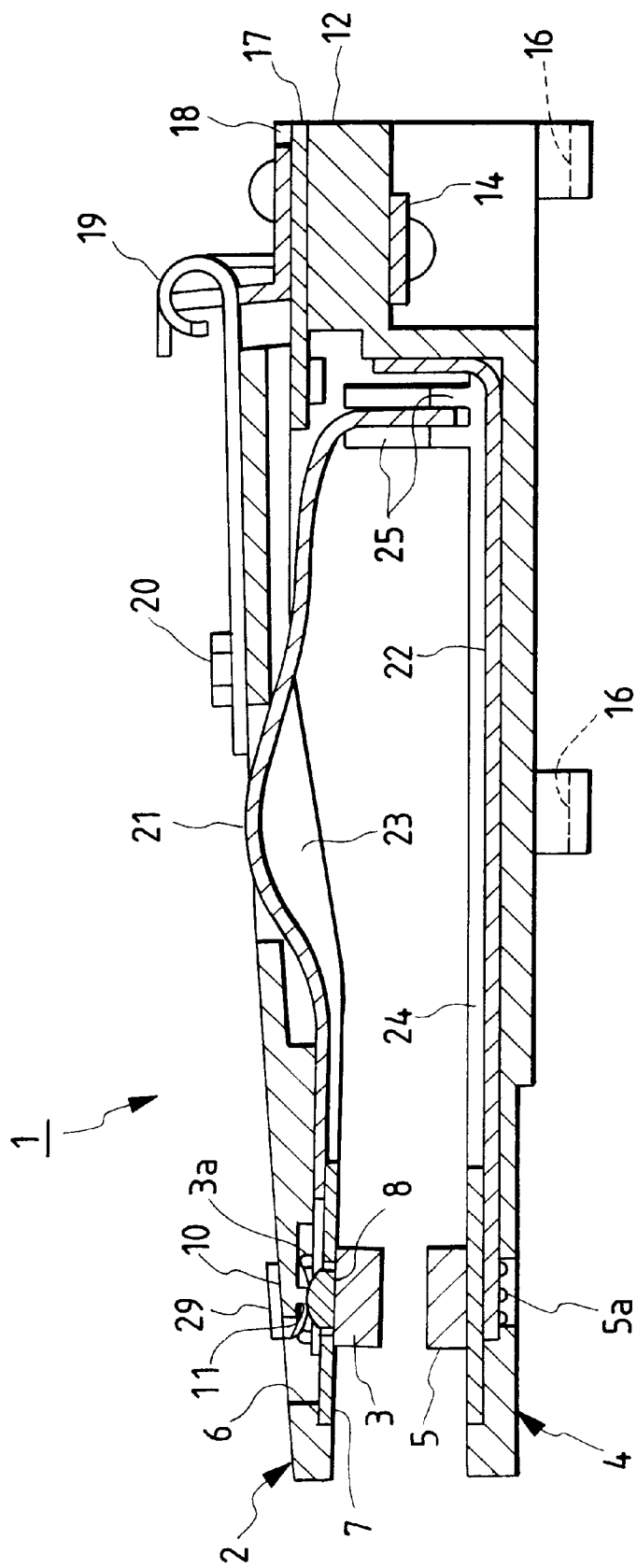
FIG. 2 is a section view taken along the line A—A shown in FIG. 1.

As shown in FIGS. 1 and 2, a base 12 is provided on a base portion of a base plate 4 of a head carriage 1. A pin 13 and a plate spring 14 are protruding from a left side face of the base 12. The pin 13 is obliquely extending horizontal backwards and engages with a groove of a feed screw (not shown) from upwards, and the plate spring 14 urges the feed screw from downwards. Thus, rotating the feed screw, the head carriage 1 goes forwardly or backwardly.

Also, a guide table 15 protrudes from a right side face of the base plate 4. A guide bar (not shown) is pierced through the holes 16 opened at front and rear ends of the guide table 15, thereby the base plate 4 can be shifted forwards or backwards while keeping its horizontal posture.

Further, a flexible connection plate 17 is mounted on an upper face of the base 12 and extended from the front end of the base 12 (in FIG. 2, left end). An upper plate 2 which is rotatable in the vertical direction is projectingly disposed on the extended portion of the flexible connecting plate 17. Still further, a plate member 18 is mounted on the flexible connection plate 17, and one end of a coil spring 19, which is disposed on the plate member 18, extends forward along an upper face of the upper plate 2, thereby the front end of the upper plate 2 is urged so as to rotate downwards.

In a middle portion of the upper plate 2 in the front-rear direction, hungers 20 protrude from both edges of the upper face of the upper plate 2 and engage with an upper frame of the magnetic disk drive (not shown). According to the structure, the upper plate 2 keeps its substantial horizontal posture, and the magnetic head 3 on the upper plate 2 and a magnetic head 3 on the base plate 4 can face each other with a predetermined gap therebetween. A magnetic disk drive (not shown) is inserted into the gap and then rotated in order to record or reproduce magnetic information.

On an upper face of the magnetic head 3, terminals 3a are projectingly provided and connected to a flexible printed code 21. On a lower face of the magnetic head 5, terminals 5a are hangingly provided and connected to a flexible printed code 22. The flexible printed codes 21 and 22 extend to near the front face of the base 12 through grooves 23 and 24 which are hollowly provided on inner side faces of the base plate 4. The flexible printed codes 21, 22 extend out of the right side of the head carriage 1 while being guided by partition plates 25 disposed on the base plate 4 near the front face of base 12. The free ends of the flexible printed codes 21 and 22 are connected to a printed board (not shown) of the magnetic disk drive.

Figure 3:
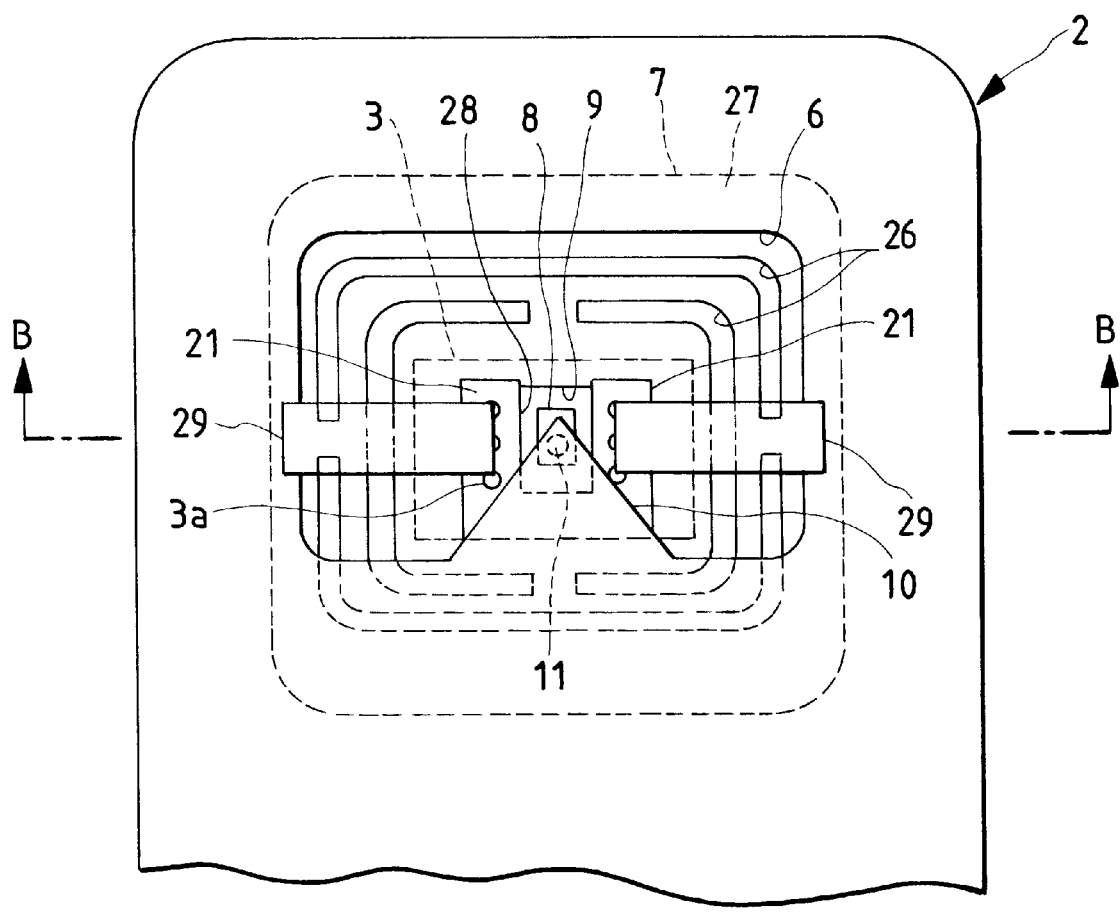
FIG. 3 is a expanded illustration of an essential part of the front end portion of the upper plate shown in FIG. 1.

As shown in FIG. 3, a gimbal 7 hanging the magnetic head 3 on the upper plate 2 is formed in a rectangle-shaped in a plan view with a thin metal plate. Double ring-like slits 26 are opened along a peripheral edge of the gimbal 7. The outer slit 26 has two discontinued portions at right and left side portions of the gimbal 7 and thereby inner and outer portions of the outer slit 26 are connected. The inner slit 26 has two discontinued portions at front and rear side portions of the gimbal 7 and thereby inner and outer portions of the inner slit 26 are also connected.

Figure 4:
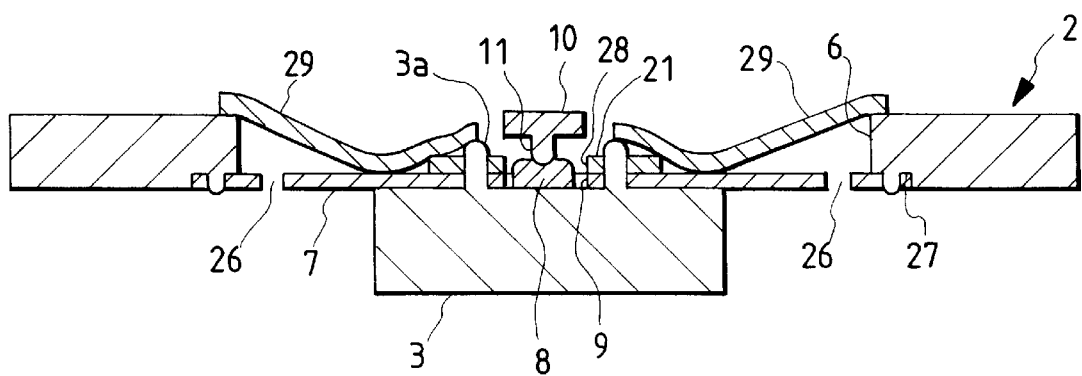
FIG. 4 is a section view taken along the line B—B shown in FIG. 3.

As shown in FIG. 4, on a lower face of the upper plate 2, a rectangular ring-like recess 27 corresponding to the shape of gimbal 7 is provided around an opening 6 opened in a front end portion of the upper plate 2. Engaging the gimbal 7 with the recess 27, the gimbal 7 is supported within the opening 6.

The end of the flexible printed code 21 connecting to the terminal 3a of the magnetic head 3 is bifurcated and a space 28 is formed therebetween. A central hole 9 is opened at the center of the gimbal 7 so as to overlap with the space 28. A pivot spacer 8 is disposed at the center of the upper face of magnetic head 3, and is exposed through the central hole 9 and the space 28. A pin 11, which is hangingly provided on a lower face of a tip end of a projection and which is triangle-shaped in a plan view, is abutted against the pivot spacer 8.

Two adhesive tapes 29 are stuck along a central line extending from left to right edges of the gimbal 7 so as to be symmetrical with regard to the center of the gimbal 7. Inner ends of the adhesive tapes 29 are respectively stuck on both of the upper face of gimbal 7 and the upper face of end portion of the flexible printed code 21 connecting to the terminals 3a. Outer ends of the adhesive tapes 29 are respectively stuck on the upper face of right and left edges of the opening 6.

In this manner, in addition to the conventional structure for a preventing the head judder which consists of the gimbal 7, the pivot spacer 8 and so on, the adhesive tapes 29 restrict excessive vibration of the gimbal 7, specifically in the direction along tracks of the magnetic disk. Thus, the head judder can be further reduced.

Figure 5:
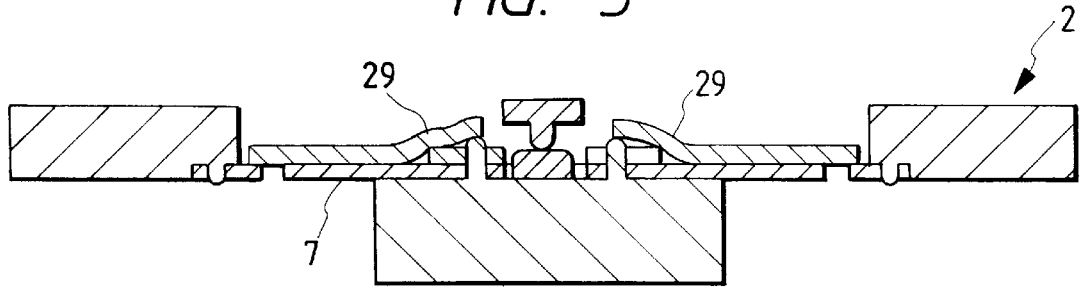
FIG. 5 is a section view showing another embodiment of the present invention.
Figure 6:
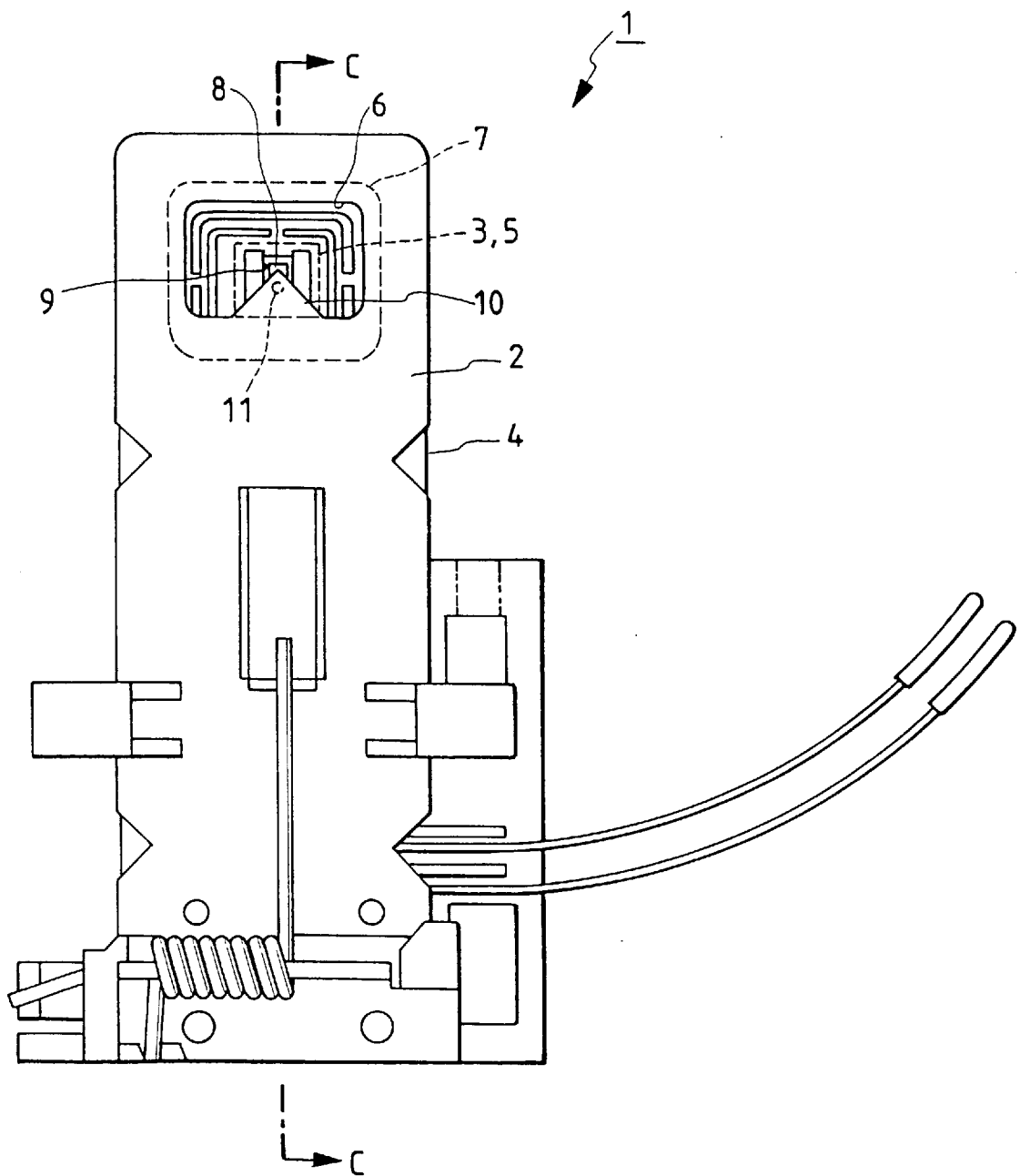
FIG. 6 is a plan view of a conventional head carriage.
Figure 7:
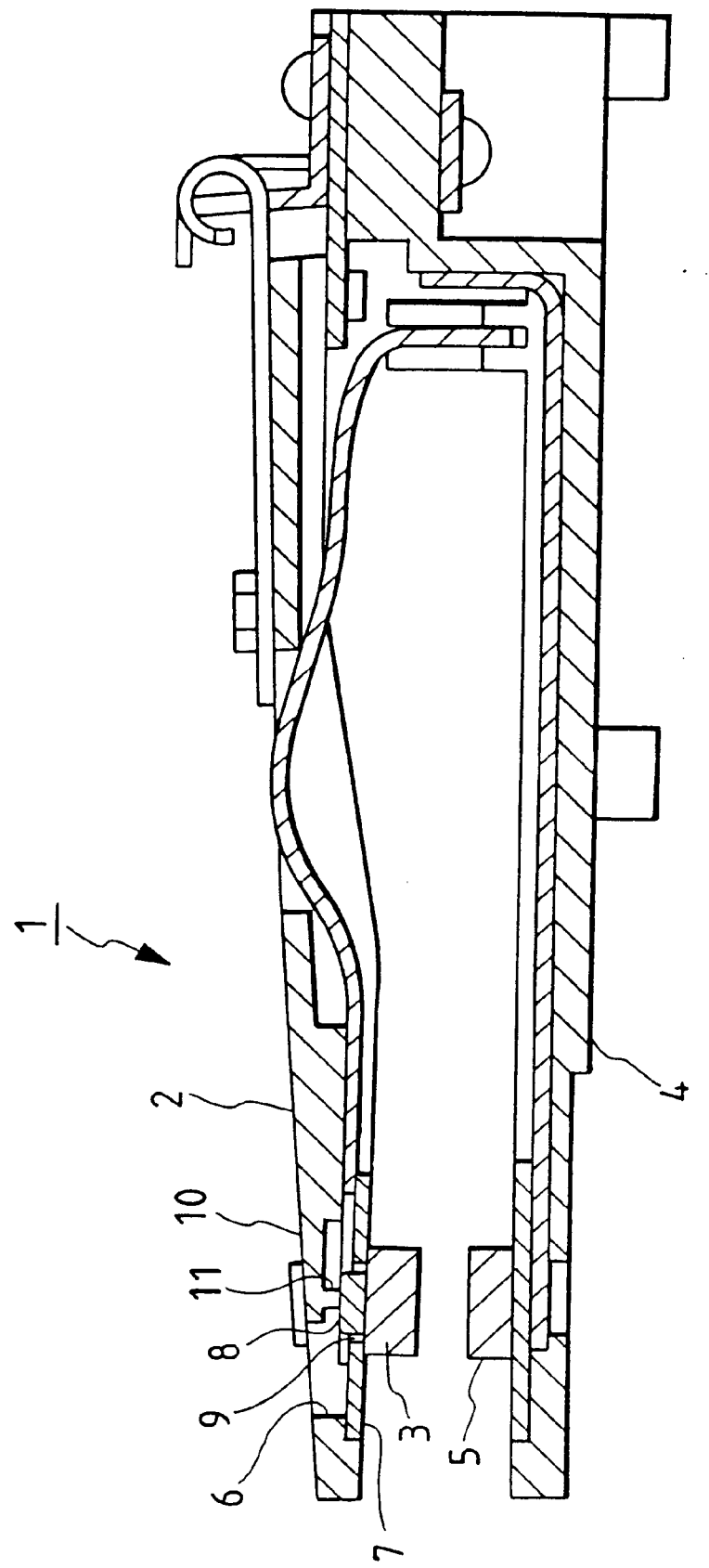
FIG. 7 is a section view taken along the line C—C shown in FIG. 6.

As shown in FIG. 5, the adhesive tapes 29 may be stuck on the upper face of gimbal 7 towards right and left edge thereof without being warped. In this embodiment, the adhesive tapes 29 may be stuck on the gimbal 7 before the gimbal 7 is mounted on the upper plate 2, thereby operation efficiency can be improved.

Also, according to the present invention, various changes and modifications are possible without departing from the scope and spirit of the invention, and of course, the present invention can cover such changes and modifications.

As has been described heretofore, according to the present invention, due to the fact that the adhesive tapes can restrict the excessive vibration of the gimbal in addition to the conventional structure for preventing the head judder which consists of the gimbal, the pivot spacer and so on, the head judder can be further reduced and thereby reliabfility of the magnetic disk drive can be improved.

What is claimed is:

1. A structure for preventing head judder of a magnetic disk drive comprising:

an opening provided at front end portion of an upper plate of a head carriage;

a gimbal disposed within the opening;

a magnetic head hangingly disposed on a central lower face of the gimbal, the magnetic head having at least one terminal extending upward from an upper face of the magnetic head and extending within the opening;

a pivot spacer disposed between the upper plate and a central portion of the upper face of the magnetic head; and a pair of adhesive tapes adhering to substantially a central upper face of the gimbal and the at least one terminal of the magnetic head, the adhesive tapes symmetrically extending towards right and left ends of the gimbal such that the adhesive tapes minimize judder of the magnetic head relative to the gimbal.

2. The structure for preventing head judder of a magnetic disk drive as set forth in claim 1, wherein the adhesive tapes have outer ends, the outer ends of the adhesive tapes are respectively adhered to right and left edges of the opening on the upper plate.

3. The structure for preventing head judder of a magnetic disk drive as set forth in claim 1, wherein the adhesive tapes have outer ends, the outer ends of the adhesive tapes are respectively adhered to right and left outermost edges of the gimbal.

4. The structure for preventing head judder of a magnetic disk drive as set forth in claim 1, further comprising a flexible printed code connecting to the terminal of the magnetic head.

5. The structure for preventing head judder of a magnetic disk drive as set forth in claim 4, further comprising a space formed between the flexible printed code and the at least one terminal of the magnetic head.

6. The structure for preventing head judder of a magnetic disk drive as set forth in claim 5, further comprising a central hole at a center portion of the gimbal and overlapping the space formed between the flexible printed code and the at least one terminal of the magnetic head.

7. The structure for preventing head judder of a magnetic disk drive as set forth in claim 6, wherein the pivot spacer is exposed through the central hole and the space formed between the flexible printed code and the at least one terminal of the magnetic head.

8. The structure for preventing head judder of a magnetic disk drive as set forth in claim 6, further comprising a pin provided on a lower face of a projection and abutting against the pivot spacer.

9. The structure for preventing head judder of a magnetic disk drive as set forth in claim 4, wherein the adhesive tapes further adhere to an upper surface of the flexible printed code.

10. The structure for preventing head judder of a magnetic disk drive as set forth in claim 4, further comprising a groove in the upper plate of the head carriage, the groove housing the flexible printed code.

11. The structure for preventing head judder of a magnetic disk drive as set forth in claim 1, further comprising hungers protruding from edges of the upper face of the upper plate.

12. A structure for preventing head judder of a magnetic disk drive comprising:

a head carriage having an upper plate, the upper plate having an opening;

a gimbal disposed within the opening;

a magnetic head disposed on a central lower face of the gimbal, the magnetic head having a terminal extending within the opening;

a pivot spacer extending from an upper face of the magnetic head; and a pair of adhesive tapes adhering to the gimbal and the terminal of the magnetic head such that the adhesive tapes minimize judder of the magnetic head relative to the gimbal.

13. The structure for preventing head judder of a magnetic disk drive as set forth in claim 12, further comprising a flexible printed code connecting to the terminal of the magnetic head.

14. The structure for preventing head judder of a magnetic disk drive as set forth in claim 13, wherein the adhesive tapes adhere simultaneously to the gimbal, the terminal of the magnetic head and the flexible printed code.

15. The structure for preventing head judder of a magnetic disk drive as set forth in claim 13, further comprising a groove in the upper plate of the head carriage, the groove housing the flexible printed code.

16. The structure for preventing head judder of a magnetic disk drive as set forth in claim 13, further comprising a space formed between the flexible printed code and the terminal of the magnetic head.

17. The structure for preventing head judder of a magnetic disk drive as set forth in claim 16, further comprising a central hole at a center portion of the gimbal and overlapping the space formed between the flexible printed code and the terminal of the magnetic head.

18. The structure for preventing head judder of a magnetic disk drive as set forth in claim 17, where in the pivot spacer is exposed through the central hole and the space formed between the flexible printed code and the terminal of the magnetic head.

19. The structure for preventing head judder of a magnetic disk drive as set forth in claim 12, further comprising hungers protruding from edges of the upper face of the upper plate.

* * * * *